2,948,722
Patented Aug. 9, 1960

2,948,722

1-(1,2,3,4-TETRAHYDROISOQUINOLINO)-ω-AMINO-3-ETHINYL-3-HYDROXY ALKANES

John H. Biel, Milwaukee, Wis., assignor, by mesne assignments, to Lakeside Laboratories, Inc., Milwaukee, Wis., a corporation of Delaware No Drawing. Filed May 5, 1958, Ser. No. 732,830

7 Claims. (Cl. 260—247.5)

This invention relates to amino substituted acetylenes. More particularly, there are provided according to the present invention novel ethinyl derivatives of N-ω-disubstituted amino-3-hydroxy alkyl)-tetrahydrosioquinolines of the formula

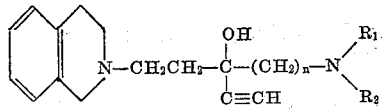

wherein n is 2 or 3, and $R_1$ and $R_2$ are the same or different lower alkyl groups or the group

represents a pyrrolidino, morpholino, piperidino or 4-lower alkyl piperazino group, and processes of producing such compounds.

These compounds may be conveniently produced by hydrating a 1-(1,2,3,4-tetrahydroisoquinolino)-ω-disubstituted amino-2-alkyne to form a 1-(1,2,3,4-tetrahydroisoquinolino)-ω-disubstituted amino-3-alkanone followed by ethinylation of the ketone to form a 1-(1,2,3,4-tetrahydroisoquinolino)-ω-disubstituted-3-ethinyl-3-alkanol. This process may be represented as follows:

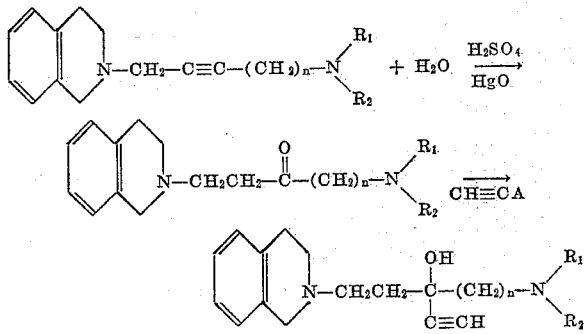

wherein n, $R_1$ and $R_2$ have the significance previously assigned, and A represents a reactive metal and generally an alkali metal such as sodium or potassium.

Some of the starting materials which may be used in this process are 1-(1,2,3,4-tetrahydroisoquinolino)-5-dimethylamino-2-pentyne, 1-(1,2,3,4-tetrahydroisoquinolino)-6-dimethylamino-2-hexyne, 1-(1,2,3-4-tetrahydroisoquinolino)-5-pyrrolidino-2-pentyne, 1-(1,2,3,4-tetrahydroisoquinolino)-6-morpholino-2-hexyne, 1-(1,2,3,4-tetrahydroisoquinolino)-5-(4-methylpiperazino)-2-pentyne and 1-(1,2,3,4-tetrahydroisoquinolino)-6-piperidino-2-hexyne. These and related starting materials may be produced by the processes disclosed in my United States Patent No. 2,830,049, issued April 8, 1958.

Hydration of the 1-(1,2,3,4-tetrahydroisoquinolino)-ω-disubstituted amino-2-alkyne is conveniently effected by contacting said compound with water in the presence of a mercury salt, such as mercuric oxide, and sulfuric acid. The hydration is most readily effected by use of a concentrated sulfuric acid, such as about 50% sulfuric acid. Heating of the reaction mixture up to about 50–60° C. increases the rate of hydration. In general, the hydration is essentially completed in about 1 to 5 hours. The intermediate 1-(1,2,3,4-tetrahydroisoquinolino)-ω-disubstituted amino-3-alkanone is readily recovered from the reaction mixture by conventional methods. Thus, the mixture may be filtered, made alkaline as with potassium hydroxide and extracted with an immiscible solvent such as ether. The product is separated by distillation of the ether. Distillation of the product is avoided since it deaminates at the boiling point.

Representative of the 1-(1,2,3,4-tetrahydroisoquinolino)-ω-disubstituted amino-3-alkanones which may be produced in this way are 1-(1,2,3,4-tetrahydroisoquinolino)-5-dimethylamino-3-pentanone, 1-(1,2,3,4-tetrahydroisoquinolino)-6-dimethylamino-3-hexanone, 1-(1,2,3,4-tetrahydroisoquinolino)-5-pyrrolidino-3-pentanone, 1-(1,2,3,4-tetrahydroisoquinolino)-6-morpholino-3-hexanone, 1-(1,2,3,4-tetrahydroisoquinolino)-6-piperidino-3-hexanone and 1-(1,2,3,4-tetrahydroisoquinolino)-5-(4-methylpiperazino)-3-pentanone.

The 1-(1,2,3,4-tetrahydroisoquinolino)-ω-disubstituted amino-3-alkanones are readily ethinylated to produce the desired 1-(1,2,3,4-tetrahydroisoquinolino)-ω-disubstituted amino-3-ethinyl-3-hydroxy alkanes. Thus, by reacting a metal acetylide such as sodium acetylide in liquid ammonia with the alkanone, evaporating the ammonia and decomposing the residual metal complex with water there is obtained the corresponding 1-(1,2,3,4-tetrahydroisoquinolino)-ω-disubstituted amino-3-ethinyl-3-hydroxy alkane. The product may be isolated by extracting the aqueous mixture with ether, drying the ethereal solution and recovering the product by vacuum distillation.

Representative of the ethinyl alcohols which may be produced in this way are 1-(1,2,3,4-tetrahydroisoquinolino)-5-dimethylamino-3-ethinyl-3-pentanol, 1-(1,2,3,4-tetrahydroisoquinolino)-6-dimethylamino-3-ethinyl-3-hexanol, 1-(1,2,3,4-tetrahydroisoquinolino)-5-pyrrolidino-3-ethinyl-3-pentanol, 1-(1,2,3,4-tetrahydroisoquinolino)-6-morpholino-3-ethinyl-3-hexanol, 1-(1,2,3,4-tetrahydroisoquinolino)-5-piperidino-3-ethinyl-3-pentanol and 1-(1,2,3,4-tetrahydroisoquinolino)-6-(4-methylpiperazino)-3-ethinyl-3-hexanol.

These compounds, as well as the intermediate alkanones, may be converted to acid addition and quaternary ammonium salts by reacting the free base with up to two moles of an acid or alkylating agent.

Mineral acids such as sulfuric acid and hydrochloric acid, or organic acids such as formic acid and citric acid, may be used to form salts.

Quaternary ammonium salts are readily produced by contacting the base with a suitable alkylating agent such as methyl chloride, ethyl bromide, methyl sulfate and the like.

These compounds, in the form of nontoxic bis-quaternary ammonium salts, are potent blood pressure lowering agents in animals. In humans they will also produce a concomitant sedative action which is desirable in the treatment of hypertension. The compounds may be administered to animals formulated in conventional pharmaceutical forms, such as tablets, capsules, solutions and the like, for this purpose.

The following examples are presented to show methods for producing certain of the novel compounds included within this invention. It is understood, however, that these examples are included only for purposes of illustration, and that the invention is not to be restricted to the embodiments specificlly disclosed therein.

EXAMPLE 1

1-(1,2,3,4-tetrahydroisoquinolino)-5-dimethylamino-2-pentyne

To 8.0 g. (0.20 mole) of sodium amide in 150 cc. of toluene was added 34 g. (0.20 mole) of N-propargyl-1,2,3,4-tetrahydroisoquinoline. The mixture was refluxed for one hour and 21 g. (0.20 mole) of dimethylaminoethyl chloride added. Stirring and refluxing were continued for 16 hours. To the cooled mixture was added 200 cc. of water; the toluene layer was separated and extracted repeatedly with dilute aqueous hydrochloric acid. The acid extract was made strongly alkaline with potassium hydroxide and the alkaline mixture extracted repeatedly with ether. The ether extracts were dried with potassium carbonate and the product isolated by distillation in vacuo, B.P. 140–142° C. (0.40 mm.); yield 34 g. (71%).

*Analysis.*—Calcd. for $C_{16}H_{22}N_2$: N, 11.57. Found: N, 11.36.

EXAMPLE 2

1-(1,2,3,4-tetrahydroisoquinolino)-5-dimethylamino-3-pentanone

To 24 cc. of 50% aqueous sulfuric acid and 3.0 g. of mercuric oxide was added 73 g. (0.30 mole) of the base of Example 1. The mixture was stirred for 3 hours at 60° C. and then allowed to stand at room temperature overnight. The solution was clarified by filtration, diluted with 200 cc. of water and made strongly alkaline with solid potassium hydroxide. The alkaline mixture was extracted repeatedly with ether and the ether extracts dried with potassium carbonate. The ether was removed by distillation to give 75 g. (76%) of the desired product. Distillation of the product was avoided since it deaminates at the boiling point.

EXAMPLE 3

1-(1,2,3,4-tetrahydroisoquinolino)-5-dimethylamino-3-ethinyl-3-pentanol

To 250 cc. of liquid ammonia and 0.1 g. of ferric nitrate was added 3.0 g. (0.12 mole) of sodium. Acetylene gas was passed into this mixture until a color change occurred. To the sodium acetylide thus formed was added 30 g. (0.12 mole) of 1-(1,2,3,4-tetrahydroisoquinolino)-5-dimethylamino-3-pentanone from Example 2. The mixture was stirred for 3 hours at room temperature. The ammonia was then allowed to evaporate. The residue was taken up in 500 cc. of water and the aqueous mixture extracted repeatedly with ether. The ether extracts were dried with potassium carbonate and the product collected in vacuo, B.P. 110–112° C. (0.005 mm.) yield 23 g. (72%).

*Analysis.*—Calcd. for $C_{18}H_{26}N_2O$: N, 9.79. Found: N, 9.75.

The dimethobromide salt was prepared by the addition of 19 g. of methyl bromide to 20 g. of the base in 100 cc. of isopropyl alcohol, M.P. 210–212° C. dec., yield 33 g. (80%).

*Analysis.*—Calcd. for $C_{20}H_{32}Br_2N_2O$: Br, 32.52; N, 5.69. Found: Br, 32.18; N, 5.46.

Various changes and modifications of the invention can be made and, to the extent that such variations incorporate the spirit of this invention, they are intended to be included within the scope of the appended claims.

What is claimed is:

1. A member of the group consisting of compounds of the formulae

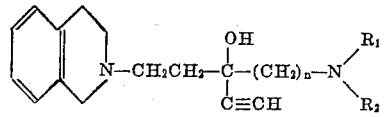

and nontoxic acid addition salts and nontoxic quaternary ammonium salts of the group consisting of methyl chloride, ethyl bromide and methyl sulfate, wherein $n$ is an integer not less than 2 and not larger than 3, and $R_1$ and $R_2$ are members of the group consisting of lower alkyl groups and groups in which $R_1$ and $R_2$ are joined so that the group

represents a member of the group consisting of the pyrrolidino, morpholino, piperidino and 4-lower alkyl piperazino.

2. A member of the group consisting of compounds of the formulae

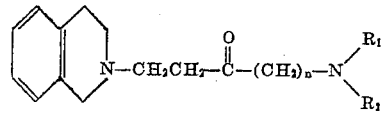

and nontoxic acid addition salts and nontoxic quaternary ammonium salts of the group consisting of methyl chloride, ethyl bromide and methyl sulfate, wherein $n$ is an integer not less than 2 and not larger than 3, and $R_1$ and $R_2$ are members of the group consisting of lower alkyl groups and groups in which $R_1$ and $R_2$ are joined so that the group

represents a member of the group consisting of the pyrrolidino, morpholino, piperidino and 4-lower alkyl piperazino.

3. 1-(1,2,3,4-tetrahydroisoquinolino) - 6 - morpholino-3-ethinyl-3-hexanol.

4. 1-(1,2,3,4-tetrahydroisoquinolino) - 5 - pyrrolidino-3-ethinyl-3-pentanol.

5. 1-(1,2,3,4-tetrahydroisoquinolino) - 5 - piperidino-3-ethinyl-3-pentanol.

6. 1-(1,2,3,4-tetrahydroisoquinolino) - 6 - piperidino-3-ethinyl-3-hexanol.

7. 1-(1,2,3,4 - tetrahydroisoquinolino) - 5 - dimethylamino-3-ethinyl-3-pentanol.

References Cited in the file of this patent

UNITED STATES PATENTS

| | | |
|---|---|---|
| 2,830,048 | Biel | Apr. 8, 1958 |
| 2,830,049 | Biel | Apr. 8, 1958 |